US 11,107,280 B1

(12) United States Patent
Clohset et al.

(10) Patent No.: US 11,107,280 B1
(45) Date of Patent: Aug. 31, 2021

(54) OCCLUSION OF VIRTUAL OBJECTS IN AUGMENTED REALITY BY PHYSICAL OBJECTS

(71) Applicant: Facebook Technologies, LLC, Menlo Park, CA (US)

(72) Inventors: Steve John Clohset, San Francisco, CA (US); Warren Andrew Hunt, Woodinville, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 0 days.

(21) Appl. No.: 16/805,484

(22) Filed: Feb. 28, 2020

(51) Int. Cl.
G06T 19/00 (2011.01)
G06T 17/20 (2006.01)

(52) U.S. Cl.
CPC ............ G06T 19/003 (2013.01); G06T 17/20 (2013.01)

(58) Field of Classification Search
None
See application file for complete search history.

(56) References Cited

U.S. PATENT DOCUMENTS

| 9,002,099 | B2* | 4/2015 | Litvak | G06K 9/00201 382/154 |
| 9,392,264 | B1* | 7/2016 | Chang | H04N 13/106 |
| 10,261,594 | B2 | 4/2019 | Marcolina | |
| 2014/0204002 | A1 | 7/2014 | Bennet | |
| 2016/0093108 | A1* | 3/2016 | Mao | A63F 13/825 345/633 |
| 2017/0140552 | A1* | 5/2017 | Woo | G06T 7/73 |
| 2017/0372510 | A1* | 12/2017 | Ye | G06T 15/205 |
| 2019/0325661 | A1* | 10/2019 | Baumbach | G06F 3/011 |
| 2020/0225761 | A1* | 7/2020 | Sinha | G06K 9/4628 |
| 2020/0334877 | A1* | 10/2020 | Pokorny | G06F 3/011 |

FOREIGN PATENT DOCUMENTS

WO    WO 2012135554 A1    10/2012

OTHER PUBLICATIONS

International Search Report and Written Opinion for International Application No. PCT/US2020/012829, dated Apr. 30, 2021.
Reinert, et al., Proxy-guided Image-based Rendering for Mobile Devices, Computer Graphics Forum, vol. 35, No. 7, 10 pages, 2016.

* cited by examiner

Primary Examiner — Ryan M Gray
(74) Attorney, Agent, or Firm — Baker Botts L.L.P.

(57) ABSTRACT

In one embodiment, a method includes by one or more computing devices, accessing an image including a hand of a user of a head-mounted display. The method includes generating, from at least the image, a virtual object representation of the hand. The virtual object representation is defined in a virtual environment. The method includes rendering, based on the virtual object representation and at least one other virtual object in the virtual environment, an image of the virtual environment from a viewpoint of the user. The image includes a set of pixels that corresponds to a portion of the virtual object representation that is visible from the viewpoint of the user. The method includes providing, to a set of light emitters of the head-mounted display, instructions to display the image. The set of pixels in the image causes the light emitters at one or more positions to be unilluminated.

20 Claims, 10 Drawing Sheets

OCCLUSION OF VIRTUAL OBJECTS IN AUGMENTED REALITY BY PHYSICAL OBJECTS

TECHNICAL FIELD

This disclosure generally relates to generating graphics for an artificial reality environment.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

In particular embodiments, a method is performed by one or more computing systems of an artificial reality system. The computing systems may be embodied in a head-mounted display or a less portable computing system. The method includes accessing an image comprising a hand of a user of a head-mounted display. The image may further include an environment of the user. The image may be generated by one or more cameras of the head-mounted display. The method may include generating, from at least the image, a virtual object representation of the hand of the user, the virtual object representation of the hand being defined in a virtual environment. The virtual object representation of the hand of the user may be generated based on a three-dimensional mesh representative of the user's hand in a virtual environment that has been prepared based on a detected pose of the user's hand in the environment. The method may include rendering, based on the virtual object representation of the hand and at least one other virtual object in the virtual environment, an image of the virtual environment from a viewpoint of the user into the virtual environment. The viewpoint into the virtual environment may be determined based on a correspondence between the viewpoint of the user into the real environment and viewpoints of the user into the virtual environment. The rendered image may include a set of pixels that corresponds to a portion of the virtual object representation of the hand that is visible from the viewpoint of the user. The set of pixels may be determined by determining that the virtual object representation of the hand of the user is at least partially in front of other virtual objects in the virtual environment from the viewpoint of the user. The method may include provid-ing, to a set of light emitters of the head-mounted display, instructions to display the image of the virtual environment, wherein the set of pixels in the image that corresponds to a portion of the virtual object representation of the hand cause the light emitters at one or more positions to be unilluminated. Unilluminated light emitters in the head-mounted display may cause light from the environment of the user to continue on to be perceived by the user.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in particular embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
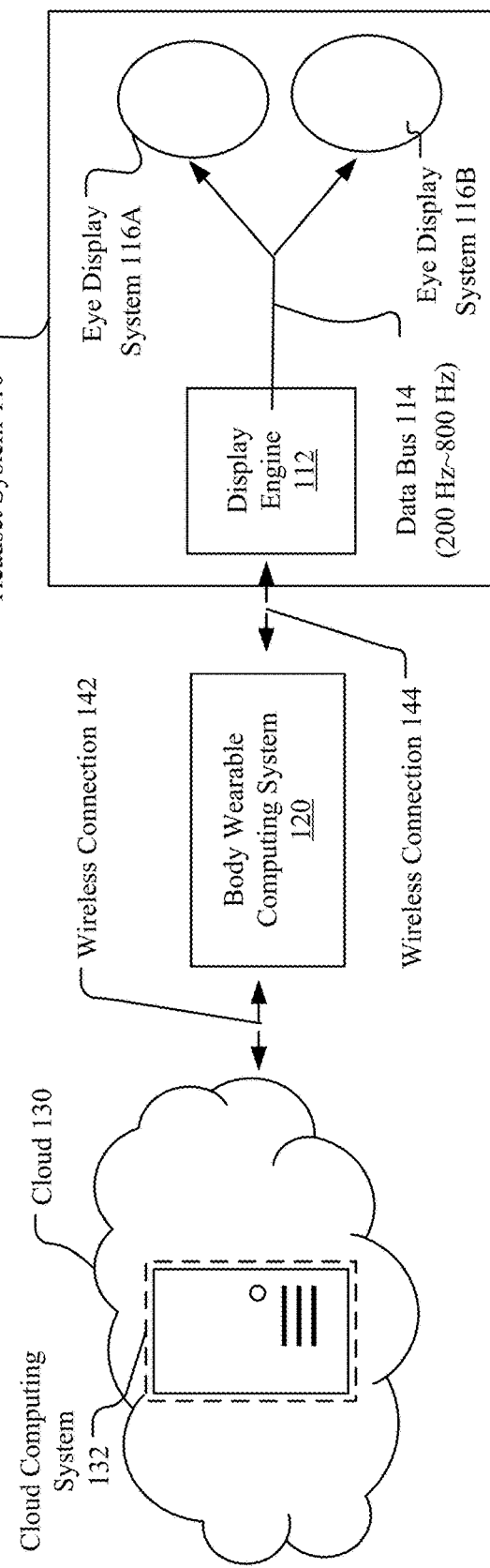
FIG. 1A illustrates an example artificial reality system.

In particular embodiments, a method is performed by one or more computing systems of an artificial reality system. The computing systems may be embodied in a head-mounted display or a less portable computing system. The method includes accessing an image comprising a hand of a user of a head-mounted display. The image may further include an environment of the user. The image may be generated by one or more cameras of the head-mounted display. The method may include generating, from at least the image, a virtual object representation of the hand of the user, the virtual object representation of the hand being defined in a virtual environment. The virtual object representation of the hand of the user may be generated based on a three-dimensional mesh representative of the user's hand in a virtual environment that has been prepared based on a detected pose of the user's hand in the environment. The method may include rendering, based on the virtual object representation of the hand and at least one other virtual object in the virtual environment, an image of the virtual environment from a viewpoint of the user into the virtual environment. The viewpoint into the virtual environment may be determined based on a correspondence between the viewpoint of the user into the real environment and viewpoints of the user into the virtual environment. The rendered image may include a set of pixels that corresponds to a portion of the virtual object representation of the hand that is visible from the viewpoint of the user. The set of pixels may be determined by determining that the virtual object representation of the hand of the user is at least partially in front of other virtual objects in the virtual environment from the viewpoint of the user. The method may include providing, to a set of light emitters of the head-mounted display, instructions to display the image of the virtual environment, wherein the set of pixels in the image that corresponds to a portion of the virtual object representation of the hand cause the light emitters at one or more positions to be unilluminated. Unilluminated light emitters in the head-mounted display may cause light from the environment of the user to continue on to be perceived by the user.

This disclosure relates to, in particular embodiments, the problem of relating physical objects to a virtual environment being presented to a user. In augmented reality (AR), a virtual environment may be displayed to a user as an augmented layer on top of the real environment. This may be done by creating a correspondence or mapping of a viewpoint into the real environment to a viewpoint into the virtual embodiment. Embodiments of this disclosure relate to the task of efficiently rendering occlusion by physical objects, for example a user's hands, of virtual objects in augmented reality. When a user's hands are seen through an AR device (such as, for example, a head-mounted display (HMD)), a user naturally expects the portions of each hand that are supposed to be in front of a virtual object in the user's line of sight to occlude virtual objects of which the user's hands are in front. Conversely, any portions of each hand that are behind a virtual object in the user's line of sight are naturally expected to be occluded by the virtual objects. For example, when a hand is gripping an object, a portion of the hand may be behind the object. A user may expect the portion of the object behind the hand should not be displayed, so that the user will be able to see her own physical hands in front of the occluded object. Presenting the user with a view of their own physical hands in front of, or interacting with, virtual objects, may assist a user with being comfortable with the augmented reality environment. For example, embodiments of this disclosure may help reduce motion sickness or simulation sickness for the user.

Present AR technology is incapable of efficiently solving these problems. In one common approach to presenting an AR experience, the user views the environment through a standard screen (e.g., a smartphone screen). The virtual environment is superposed on an image of the environment capture by a camera. This requires significant computational resources, as the image of the environment must be captured and processed rapidly, and will quickly drain the battery of mobile devices. Additionally, this type of experience is not particularly immersive for the user, as they are limited to viewing the environment through a small screen. In a related approach, it is difficult for many current systems to accurately detect a user's hands using available camera techniques to such a degree that the user's hands can be user to manipulate virtual objects in the virtual environment. There is a lack of advanced techniques, such as those disclosed here, to accurately model the user's hands in the virtual environment and the effects caused by the user's hands in that environment, and to render the virtual environment based on the effects. As one additional example, current rendering approaches for artificial reality systems are incapable of rendering most virtual environment as a sufficiently high frame rate and degree of quality that the user will be comfortable experiencing the virtual environment for any substantial length of time. As described herein, a high frame rate may be particularly advantageous for mixed or augmented reality experiences because the juxtaposition between the virtual objects and the user's real environment will allow the user to quickly discern any technical failings in the rendering. The approaches described herein address all of the technical issues and more.

In this disclosure, an example of a user's hand will be given, however, the approaches described herein can be used with other types of objects. Such other objects include, other parts of the user's body, objects held by the user (e.g., a pen or other indicator), specific objects designated for passthrough by the user (e.g., the user's child or pet), generic objects designated for passthrough by the user or by the provider of the AR headset (e.g., vehicles, other people), and many other objects. To allow for real object passthrough, e.g., hand occlusion, one or more cameras on an AR headset (e.g., an HMD) captures images of a scene, including the object for which occlusions will be determined. A computing device (which, as described herein may be embodied in the HMD or may be in wired or wireless communication with the HMD) executes a hand-tracking algorithm to detect the hand in the image. The positions of the hand's features, such as fingers and joints, in the image are then determined. A virtual object representation of the hand (e.g., a three-dimensional mesh that looks like the user's hand) is generated based on the detected positions of the hand fingers and joints.

The computing device determines a distance from the user's hand to the viewpoint of the user into the real environment. The computing device correlates that distance with a distance from the virtual object representation of the hand to the viewpoint of the user into the virtual environment. The computing device also creates a grid for storing height information for different regions of the hand. From the image(s) and three-dimensional mesh, the computing device determines the heights of the points of the hand (e.g., the height of a particular point of the hand relative to a mean or median height or reference point on the hand). The determined heights indicate the positions of the points on the hand relative to rest of the hand. Combined with the determined distance, the height can be used to determine an exact position of various portions of the hand relative to the user.

While rendering the virtual environment and presenting the virtual environment to the user, the portions of the hand that are closer to the user than any virtual object should be visible to the user, while portions of the hand that are behind at least one virtual object should be occluded. The user's actual physical hand can be made visible to the user through the HMD of the AR system. In particular embodiments, light emitting components (e.g., LEDs) in the HMD that display the virtual objects in the virtual environment can be selectively disabled to allow light from the real environment to pass through the HMD to the user's eyes. That is, the computing device creates cut-out areas in the rendered image where the hand is to appear. Thus, for example, the user's actual physical thumb can be made visible to the user through the HMD by instructing light emitters not to illuminate positions of the display that correspond to the thumb's position. Since the light emitters are turned off, the portions of any virtual objects behind it are not displayed.

To properly render real-world object occlusions, the light emitters that correspond to a portion of the object (e.g., portion of the user's hand) should be turned off, or instructed not to illuminate, when that portion of the hand is closer to the user in the real environment than any virtual objects in the virtual environment and turned on when there is a virtual object between the user and that portion of the hand. Portions of the object (e.g., a finger on a hand) that are farther from the user in the real environment than a virtual object is from the user in the virtual environment are shown as being behind the virtual objects by the light emitters displaying the virtual object. Comparing the distances to real-world object and to virtual objects is possible because, for example, the distances are determined by the hand-tracking algorithm. The virtual object distances are known by the application or scene executing on the AR system and available to the AR system and HMD.

Given the virtual object representation of the user's hand and the known heights of the positions of the hand, the portions of the hand that should be visible to the user can be made visible by the HMD as follows. A frame showing the virtual environment is rendered based on the user's current pose (e.g., position and orientation) by a primary rendering component at a first frame rate, such as 30 fps. As part of rendering the frame, two items are generated: (1) a two-dimensional opaque texture for the hand based on the three-dimensional mesh, and (2) the height map for the hand. The two-dimensional texture is saved as the texture of a planar object representation for the virtual object representation (also referred to throughout this disclose as a "surface"). These operations may be performed by the HMD, or by a separate computing device in communication with the HMD hardware (e.g., a cloud computer, desktop computer, laptop computer, or mobile device). Light emitters can be easily instructed not to illuminate by using a specially designated color for the texture. In AR, it may be desirable to have a default background that allows for light from the real environment to passthrough. In that way, the immersion of the virtual objects appearing the real environment can be greatly enhanced. Thus, the background may be associated with a color that is translated to instructions to the light emitters not to illuminate. In particular embodiments, this color may be referred to as "opaque black" meaning, for example, that that no light behind an object associated with that texture shows through. The virtual object representation (e.g., the planar object) may be associated with such a color to cause the LEDs that correspond to pixels at locations where the hand is visible to be off (i.e., not illuminate).

The HMD then renders subframes at a second frame rate, such as 200 fps based on the previously generated frames (e.g., based on the frame that was generated at 30 fps). For each subframe, the AR system may perform a primary visibility test by casting one or more rays from the user's current viewpoint into the virtual environment based on the user's pose (which could be different than the pose used for generating the main 30 fps frame) for each individual pixel or tile of pixels into the virtual environment. The ray is a ray in the individual pixel case or may be conceptualized as a pyramid in the tile case. In particular embodiments, the virtual environment may have a limited number of virtual objects. For example, the AR system may limit the number of discrete objects in the virtual environment (including the object created to represent the user's hand). In some embodiments, multiple objects that are anticipated to move in a similar manner for a range of frames may be grouped together. The virtual objects may be represented by a planar object with corresponding height map information. If the projected ray intersects a surface that corresponds to a user's hand, then it samples the associated texture to render the subframe. Since the texture is opaque black, which indicates that the light emitters are not to be illuminated, the actual physical hand is visible through the unilluminated area of the HMD, which is transparent.

In particular embodiments the AR system may support a per-pixel height test for each surface based on the height map. In this case, portions of the hand that are in front of a virtual object can occlude the virtual object with a pixel-level resolution, while pixels of the same hand that are behind the virtual object can be occluded by individual pixels of the virtual object in the display. In embodiments using a height map, the height test per pixel is determined based on the depth of the real or virtual object to the viewpoint of the user plus a difference as recorded in the height map. Using per-pixel height for the virtual objects greatly improves the visual appearance of hand occlusion.

In particular embodiments, per-pixel height information may not be available (e.g., due to restrictions on available computational resources). In such cases, the hand may be represented by the virtual object representation solely as a planar object. As described above, the depth of the planar object (e.g., the distance from the planar object to the viewpoint of the user into the virtual environment) is known. In particular embodiments, for each location on the flat surface, the depth can be determined using a mathematical transformation. The virtual object representation of the real object (e.g., the planar object) and the virtual objects (which may themselves be represented by surfaces) form an ordered grouping of surfaces where the order is based the object's depth. The planar object corresponding to the end is therefore in front of or behind each plane.

Using a height map to determine real object occlusion of virtual objects as described above may increase power consumption. For example, if the HMD generates the height map, that may consume considerable resources. As another example, if the HDM is generated by another computing device, the height map may have to be transmitted to the HMD. The AR system may determine whether and how to use the height map based on available power. If sufficient power is available, the height map can be generated and transmitted. If there is insufficient power available, using a plane without a height map may be sufficient to produce a reasonable appearance of hand occlusion, especially if the distance of the virtual objects to the viewpoint of the user are significant.

In particular embodiments the primary rendering device, e.g., other computing device besides the HMD may be more processing capacity and electrical power supply than the HMD. The primary rendering device may therefore perform certain portions of the techniques described herein. For example, the primary rendering device may perform the hand tracking computations, generate the three-dimensional mesh, the two-dimensional opaque texture, and the height map for the hand. For example, the primary rendering device may receive the images created by the cameras of the HMD and perform the necessary processing using specialized computing hardware designed to be more efficient or powerful on the particular tasks. However, if the HMD has sufficient processing and electrical power, the HMD can perform one or more of those steps (e.g., using its own on-board computing components) to reduce latency. In particular embodiments, all of the steps described herein are performed on the HMD.

FIG. 1A illustrates an example artificial reality system 100. In particular embodiments, the artificial reality system 100 may include a headset system 110 (which may be embodied in a HMD), a body wearable computing system 120, a cloud computing system 132 in a cloud computing environment 130, etc. In particular embodiments, the headset system 110 may include a display engine 112 which is connected to two eye display systems 116A and 116B through a data bus 114. The headset system 110 may be a system including a head-mounted display (HMD) which may be mounted on a user's head to provide artificial or augmented reality to the user. The headset system 110 may be designed to be lightweight and highly portable. As a result, the headset system may have limited power available in its power sources (e.g., batteries). The display engine 112 may provide display data to the eye display systems 116A and 116B though the data bus 114 with relative high data rates (e.g., suitable to support refresh rates of 200 Hz or higher). The display engine 112 may include one or more controller blocks, texel memories, transform blocks, pixel blocks, etc. The texels stored in the texel memories may be accessed by pixel blocks and may be provided to the eye display systems 116A and 116B for display. More information on the described display engine 112 may be found in U.S. patent application Ser. No. 16/657,820, filed Oct. 1, 2019, U.S. patent application Ser. No. 16/586,590, filed Sep. 27, 2019, and U.S. patent application Ser. No. 16/586,598, filed Sep. 27, 2019, which are incorporated by reference.

In particular embodiments, the body wearable computing system 120 may be worn on the body of a user. In particular embodiments, the body wearable computing system 120 may be a computing system (e.g., a laptop, a desktop, a mobile computing system) that is not worn on a user body. The body wearable computing system 120 may include one or more GPUs, one or more smart video decoders, memories, processors, and other modules. The body wearable computing system 120 may have more computational resources than the display engine 112 but, in some embodiments, may still have limited power in its power sources (e.g., batteries). The body wearable computing system 120 may be coupled with the headset system 110 through a wireless connection 144. The cloud computing system 132 may include high performance computers (e.g., servers) and may communicate with the body wearable computing system 120 through a wireless connection 142. In some embodiments, the cloud computing system 132 may further communicate with the headset system 110 through a wireless connection (not shown). The body wearable computing system 120 may generate data for rendering at a standard data rate (e.g., suitable to support refresh rates of 30 Hz or higher). The display engine 112 may up-sample the data received from the body wearable computing system 120 to generate frames to be displayed by the eye display systems 116A and 116B at a higher frame rate (e.g., 200 Hz or higher).

Figure 1B:
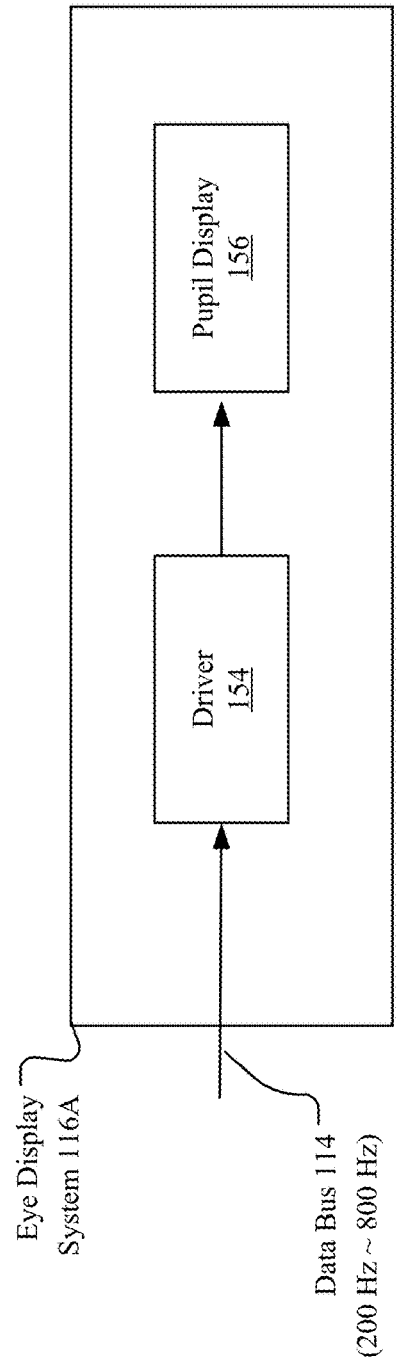
FIG. 1B illustrates an example eye display system of a headset system.

FIG. 1B illustrates an example eye display system (e.g., 116A or 116B) of the headset system 110. In particular embodiments, the eye display system 116A may include a driver 154, a pupil display 156, etc. The display engine 112 may provide display data to the pupil display 156, the data bus 114, and the driver 154 at high data rates (e.g., suitable to support refresh rates of 200 Hz or higher).

Figure 2:
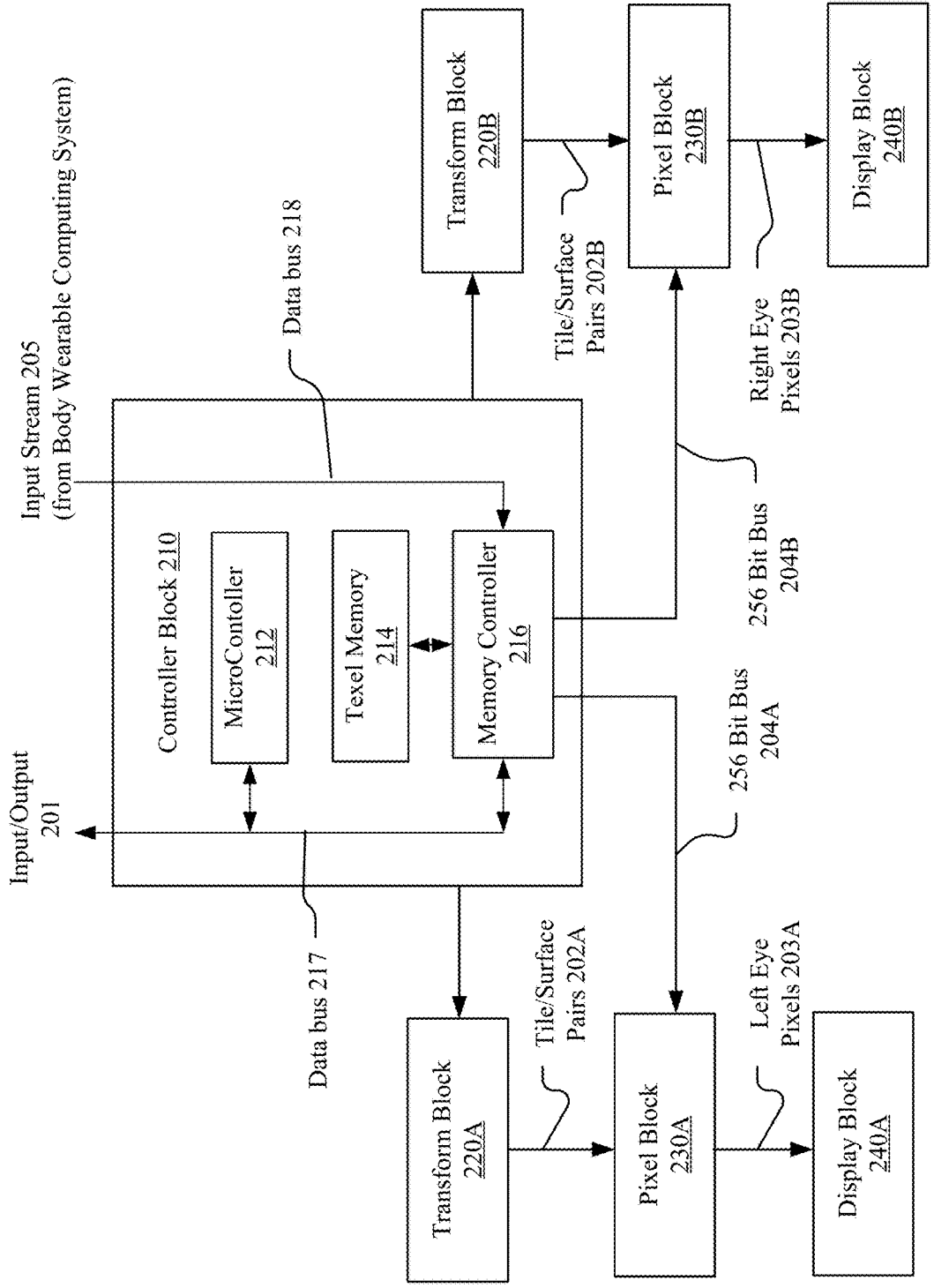
FIG. 2 illustrates a system diagram for a display engine.

FIG. 2 illustrates a system diagram for a display engine 112. In particular embodiments, the display engine 112 may include a control block 210, transform blocks 220A and 220B, pixel blocks 230A and 230B, display blocks 240A and 240B, etc. One or more of the components of the display engine 112 may be configured to communicate via a high-speed bus, shared memory, or any other suitable method. As shown in FIG. 2, the control block 210 of display engine 112 may be configured to communicate with the transform blocks 220A and 220B, pixel blocks 230A and 230B, and display blocks 240A and 240B. As explained in further detail herein, this communication may include data as well as control signals, interrupts, and other instructions.

In particular embodiments, the control block 210 may receive input from the body wearable computing system (e.g., 120 in FIG. 1A) and initialize a pipeline in the display engine 112 to finalize the rendering for display. In particular embodiments, the control block 210 may receive data and control packets from the body wearable computing system at a first data rate or frame rate. The data and control packets may include information such as one or more data structures comprising texture data and position data and additional rendering instructions. In particular embodiments the data structures may comprise two-dimensional rendering information. The data structures may be referred to herein as "surfaces." The control block 210 may distribute data as needed to one or more other blocks of the display engine 112. The control block 210 may initiate pipeline processing for one or more frames to be displayed. In particular embodiments, each of the eye display systems 116A and 116B may comprise its own control block 210. In particular embodiments, one or more of the eye display systems 116A and 116B may share a control block 210.

In particular embodiments, the transform blocks 220A and 220B may determine initial visibility information for surfaces to be displayed in the artificial reality scene. In general, the transform blocks 220A and 220B may cast rays with origins based on pixel locations in an image to be displayed and produce filter commands (e.g., filtering based on bilinear or other types of interpolation techniques) to send to the pixel blocks 230A and 230B. The transform blocks 220A and 220B may perform ray casting based on the current viewpoint of the user into the user's real or virtual environment. The user's viewpoint may be determined using the headset's sensors, such as one or more cameras (e.g., monochrome, full-color, depth-sensing), inertial measurement units, eye trackers, and/or any suitable tracking/localization algorithms, such as simultaneous localization and mapping (SLAM)) into the environment and/or virtual scene where surfaces are positioned and may produce results to send to the pixel blocks 230A and 230B.

In general, the transform blocks 220A and 220B may each comprise a four-stage pipeline, in accordance with particular embodiments. The stages of a transform block 220A or 220B may proceed as follows. A ray caster may issue ray bundles corresponding to arrays of one or more aligned pixels, referred to as tiles (e.g., each tile may include 16×16 aligned pixels). The ray bundles may be warped, before entering the artificial reality scene, according to one or more distortion meshes. The distortion meshes may be configured to correct geometric distortion effects stemming from, at least, the eye display systems 116A and 116B of the headset system 110. In particular embodiments, the transform blocks 220A and 220B may determine whether each ray bundle intersects with surfaces in the scene by comparing a bounding box of each tile to bounding boxes for the surfaces. If a ray bundle does not intersect with an object, it may be discarded. Tile-surface intersections are detected, and the corresponding tile-surface pair is passed to the pixel blocks 230A and 230B.

In general, the pixel blocks 230A and 230B may determine color values from the tile-surface pairs to produce pixel color values, in accordance with particular embodiments. The color values for each pixel may be sampled from the texture data of surfaces received and stored by the control block 210. The pixel blocks 230A and 230B may receive tile-surface pairs from the transform blocks 220A and 220B and may schedule bilinear filtering. For each tile-surface pair, the pixel blocks 230A and 230B may sample color information for the pixels corresponding to the tile using color values corresponding to where the projected tile intersects the surface. In particular embodiments, the pixel blocks 230A and 230B may process the red, green, and blue color components separately for each pixel. In particular embodiments, as described herein, the pixel block may employ one or more processing shortcuts based on the color (e.g., color and opacity) associated with the surface. In particular embodiments, the pixel block 230A of the display engine 112 of the first eye display system 116A may proceed independently, and in parallel with, the pixel block 230B of the display engine 112 of the second eye display system 116B. The pixel block may then output its color determinations to the display block.

In general, the display blocks 240A and 240B may receive pixel color values from the pixel blocks 230A and 230B, convert the format of the data to be more suitable for the display (e.g., if the display requires a specific data format as in a scanline display), apply one or more brightness corrections to the pixel color values, and prepare the pixel color values for output to the display. The display blocks 240A and 240B may convert tile-order pixel color values generated by the pixel blocks 230A and 230B into scanline or row-order data, which may be required by the physical displays. The brightness corrections may include any requisite brightness correction, gamma mapping, and dithering. The display blocks 240A and 240B may output the corrected pixel color values directly to the physical display (e.g., pupil display 156 in FIG. 1B via the driver 154) or may output the pixel values to a block external to the display engine 112 in a variety of formats. For example, the eye display systems 116A and 116B or headset system 110 may comprise additional hardware or software to further customize backend color processing, to support a wider interface to the display, or to optimize display speed or fidelity.

In particular embodiments, the controller block 210 may include a microcontroller 212, a texel memory 214, a memory controller 216, a data bus 217 for I/O communication, a data bus 218 for input stream data 205, etc. The memory controller 216 and the microcontroller 212 may be coupled through the data bus 217 for I/O communication with other modules of the system. The microcontroller 212 may receive control packages such as position data and surface information though the data bus 217. The input stream data 205 may be input to controller blocks 210 from the body wearable computing system after being set up by the microcontroller 222. The input stream data 205 may be converted to the required texel format and stored into the texel memory 214 by the memory controller 216. In particular embodiments, the texel memory 214 may be static random-access memory (SRAM).

In particular embodiments, the body wearable computing system may send input stream data 205 to the memory controller 216, which may convert the input stream data into texels with required formats and store the texels with swizzle patterns in the texel memory 214. The texel memory organized in these swizzle patterns may allow the texels (e.g., in 4×4 texel blocks) that are needed for determining at least one color component (e.g., red, green, and/or blue) of every pixel all pixels associated with a tile (e.g., "tile" refers to an aligned block of pixels, such as a block of 16×16 pixels) to be retrieved by the pixel bocks 230A and 230B using one reading operation. As a result, the display engine 112 may avoid excess multiplexing operations typically required for reading and assembling texel arrays if the texel array is not stored in appropriate patterns and may therefore reduce computational resource requirement and power consumption of the display engine 112 and the headset system overall.

In particular embodiments, the pixel blocks 230A and 230B may generate pixel data for display based on retrieved texels from the texel memory 212. The memory controller 216 may be coupled to pixel blocks 230A and 230B through two 256 bits data buses 204A and 204B, respectively. The pixel bocks 230A and 230B may receive the tile/surface pairs 202A and 202B from the respective transform blocks 220A and 220B and may identify the texels that are needed to determine at least one color component of all the pixels associated with the tile. The pixel blocks 230A and 230B may in-parallel retrieve the identified texels (e.g., a 4×4 texel array) from the texel memory 214 through the memory controller 216 and the 256 bits data buses 204A and 204B. For example, the 4×4 texel array that are needed to determine at least one color component of all the pixels associated with a tile may be stored in one memory block and may be retrieved using one memory reading operation. The pixel blocks 230A and 230B may use multiple sample filter blocks (e.g., one for each color component) to in-parallel perform interpolation on different groups of texels to determine the corresponding color component for the corresponding pixels. The pixels values 203A and 203B for each eye may be sent to the display blocks 240A and 240B for further processing before being displayed by the eye display systems 116A and 116B, respectively.

In particular embodiments, the artificial reality system 100, and particularly the headset system 110, may be used to render an augmented reality environment to a user. An augmented reality environment may comprise elements of a virtual reality environment (e.g., virtual reality objects) rendered for a user so that the virtual elements appear on top of, or a part of, the real environment of the user. For example, a user may be wearing an HMD (e.g., headset system 110) embodying features of the techniques disclosed herein. The HMD may encompass a display that permits light from the environment of the user to ordinarily continue on to the eyes of the user. When, however, a light emitting component (e.g., LED, OLED, microLED, etc.) of the display is illuminated at a particular position in the display, the color of the LED may be superposed on top of the environment of the user. Thus, virtual objects may appear in front of the real environment of the user when a light emitter of the display is illuminated, while the environment of the user may be visible at a particular position through the display when the light emitting component at that position is unilluminated. This may be accomplished without the use of cameras to re-render the environment. This procedure may increase the immersion of the user and the user's comfort using the artificial reality system 100 while simultaneously decreasing computing power needed and battery consumption caused by rendering the virtual environment.

In particular embodiments, the selectively illuminated display may be used to facilitate a user's interactions with virtual objects in the virtual environment. For example, the positions of a user's hands may be tracked. In previous systems, the only way for a user's hands to be represented in the virtual environment, even in hand-tracking systems, is to generate and render some virtual representation of the hands. In many use scenarios this may be inappropriate. For example, it may be desirable in a workplace environment for the user's hands themselves to be visible to the user as they interact with an object. For example, it may be desirable for an artist to see their own hands as they are holding a virtual paintbrush or other tool. Disclosed herein are techniques for enabling such advanced display.

Figure 3A:
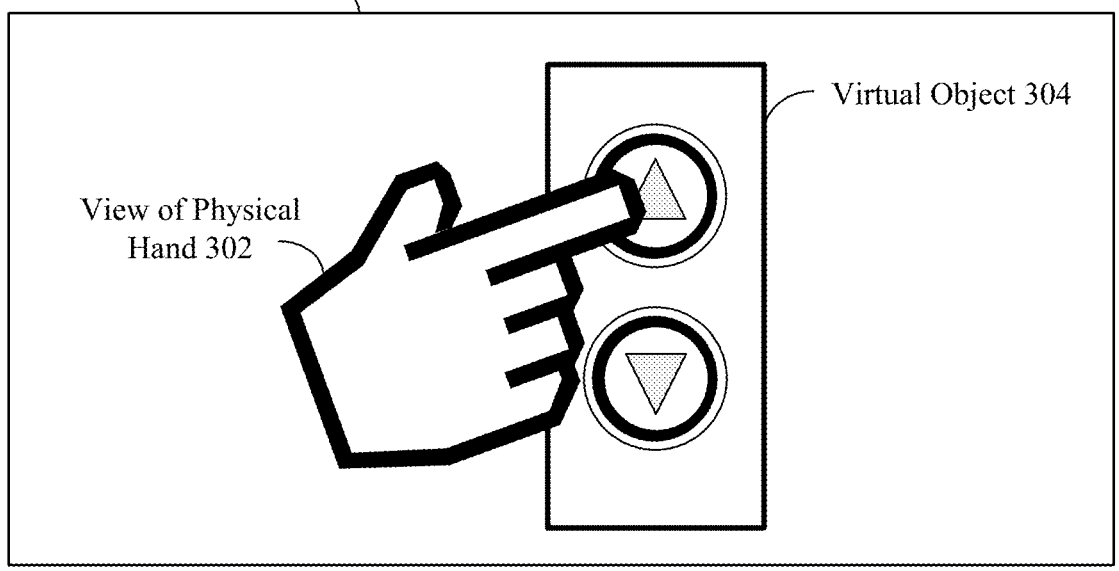
FIGS. 3A-3B illustrate an example image viewed through an artificial reality system.

FIG. 3A illustrates an example of an in-headset view of a user illustrating the example of a user viewing their own hand in through an artificial reality display system. The in-headset view 300 shows a composite (e.g., mixed) reality display that includes a view of a virtual object 304 and the view of the user's physical hand 302. The user is attempting to press a button on the virtual object 304. As such, the user's hand 302 is closer to the user's viewpoint than portions of the virtual object 304. This coincide with the ordinary intuition of the user, as when one is attempting to push a button (e.g., an elevator button), one's hand appears in front of portions of the elevator button and panel.

Figure 3B:
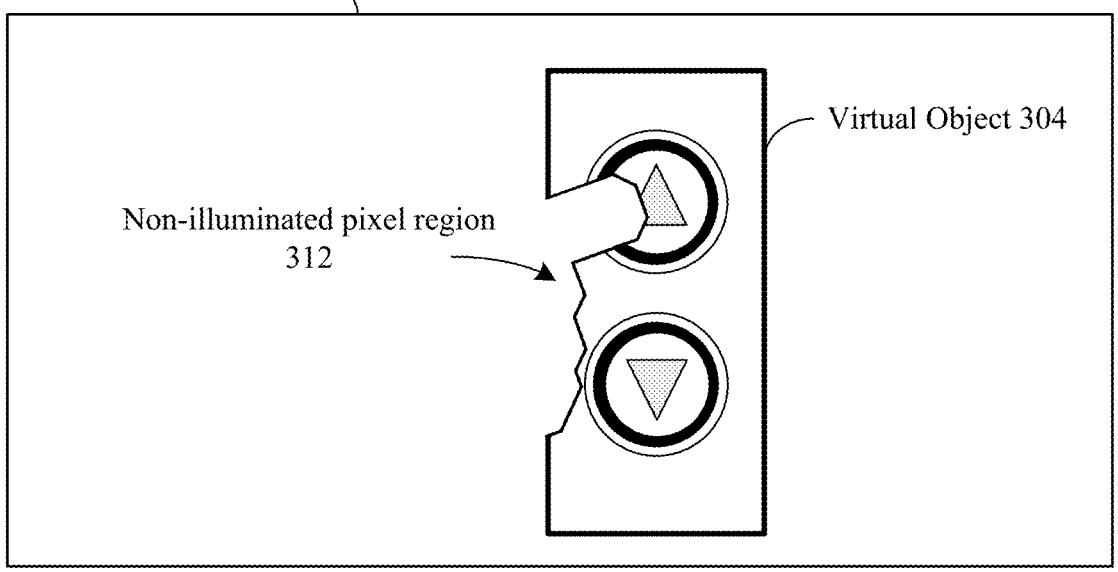

FIG. 3B illustrates an alternative view of the same scene. Where FIG. 3A illustrates the in-headset view 300 of the user, FIG. 3B illustrates only the pixels 310 displayed by the light emitting components of the headset system. The pixels include the representation of the virtual object 304. However, because any illuminated light emitters in the display system will cause the virtual object 304 to be displayed superposed on the environment, the rendering of the virtual object 304 must be modified so that the user's hand can be shown through the display (as in FIG. 3A). To do this, the rendering of the virtual object 304 is modified to include a cut-out closely tracing the shape of the user's hand. When displaying the virtual environment, the cut-out portion are treated as a region of unilluminated pixels 312. In other words, the light emitting components that would ordinarily display colors of the virtual object 304 are instead instructed not to illuminate. The resulting impression is to allow the light of the environment of the user to continue through, creating the composite effect shown in FIG. 3A.

Figure 4A:
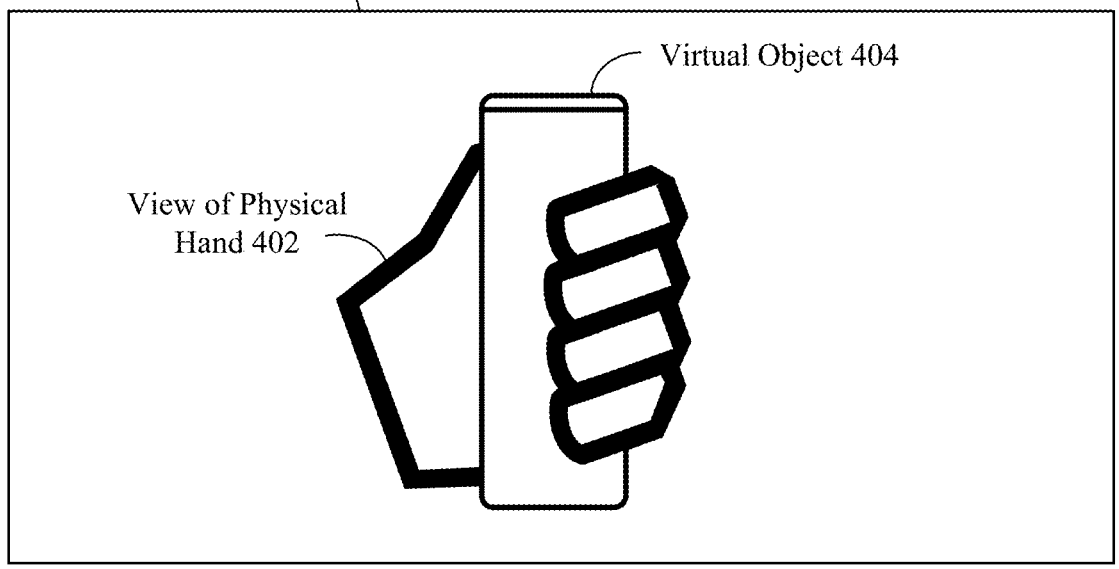
FIGS. 4A-4B illustrate an example image viewed through an artificial reality system.

FIG. 4A illustrates another example of an in-headset view of a user. In FIG. 4A, the in-headset view 400 illustrates the user interacting with a virtual object 404 by wrapping their fingers around the virtual object 404. The view of the user's physical hand 402 shows the virtual object 404 partially occluding the user's hand (e.g., near the palm of the user's hand), and partially occluded by the user's hand 402 (e.g., the user's fingers). The user may be able to more intuitively understand that the user is holding the virtual object 404 even though they do not feel the object physically, because of the partial rendering techniques described herein.

Figure 4B:
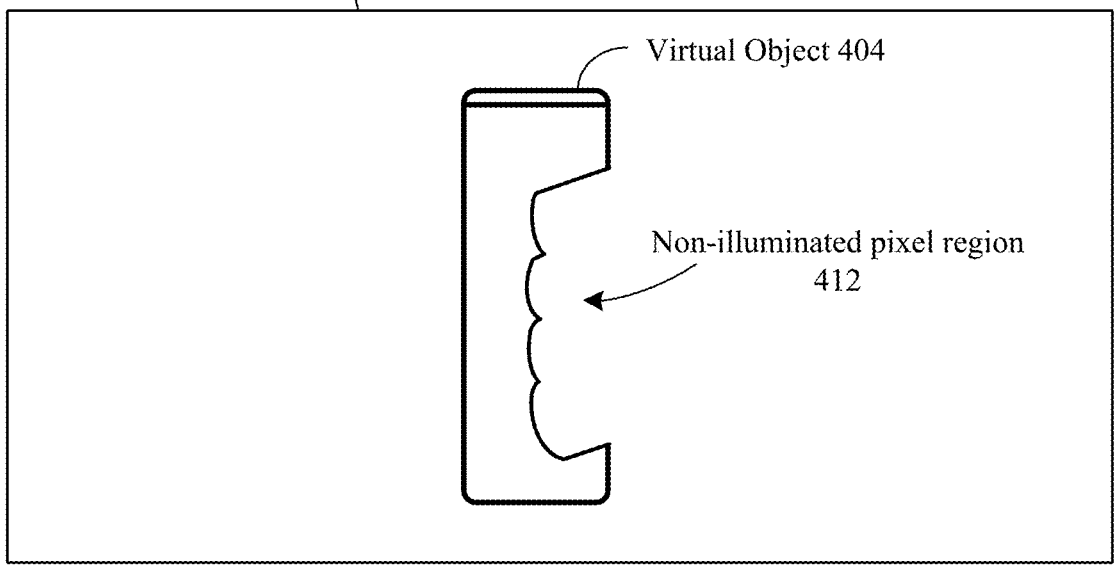

FIG. 4B illustrates an alternative view of the scene shown in FIG. 4A. As with FIG. 3B, FIG. 4B illustrates only the pixels 410 display by the light emitting components of the headset system. The pixels include the representation of the virtual object 404. A region of the virtual object 404 is not displayed (e.g., the virtual object includes a non-illuminated pixel region 412) because that region is occluded by the user's hand in the in-headset view of the virtual and real environments. Note that FIG. 4B illustrates that it will be insufficient to merely determine where the user's hand is in the scene and always cause the user's hand to be displayed. Consider a counter example to what is shown in FIGS. 4A and 4B. If the user's hands were always caused to appear in front of any virtual object, the artificial reality system 100 would be incapable of rendering a scenario like that shown in FIG. 4A where the user's hand is partially occluded by the virtual object 404. Thus, to accurately display the user's hands in the mixed reality environment interacting with virtual objects, the depth (e.g., the distance between the point and the user's viewpoint) of individual portions of the user's hands must be tracked and compared to the depth of virtual objects.

Figure 5:
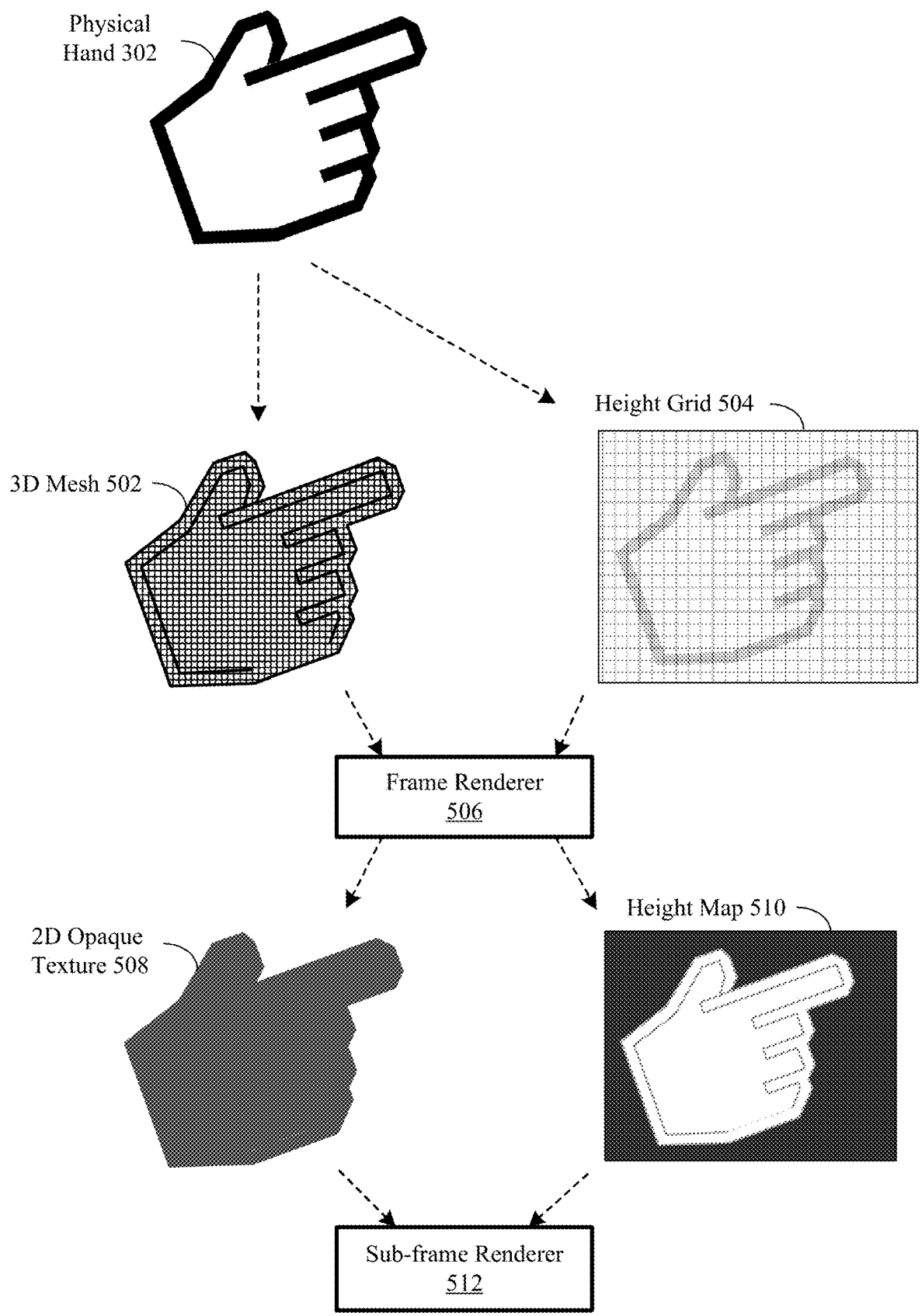
FIG. 5 illustrates visual representations of a user's hand while detecting virtual object occlusion.

FIG. 5 illustrates a graphical representation for the treatment of an image of the user's hands when determining what portions of the user's hands occlude or are occluded by virtual objects. FIG. 5 may be understood to illustrate a method for generating the states of the image of the user's hand and virtual representation thereof that are used in this disclosure. The example shown in FIG. 5 continues from the example of FIGS. 3A-B. One or more images 302 of the user's physical hand are captured by one or more cameras of the headset system 110. A computing system (which in some embodiments may include the headset system 110 or the body wearable computing system 120) performs hand tracking algorithms to determine a pose of the user's hand based on the relative positions of various discrete locations on the user's hand. For example, the hand tracking algorithm may detect the locations of fingertips, joints, the palm and back of the hand, and other distinct portions of the user's hand. The computing system may also determine a depth of the user's hand (e.g., the distance between the hand and the viewpoint of the user as represented by the camera).

From the determined pose, the computing system generates a 3D mesh 502 for the hand. The 3D mesh may include a virtual object representation of the user's hand. In particular embodiments, the 3D mesh may be similar to a 3D mesh that might be generated to render a representation of the user's hand in an immersive artificial reality scene. The computing system also generates a height grid 504 overlay for the 3D mesh. The computing system may generate the height grid based on the 3D mesh. For example, the computing system may determine a fixed plane for the hand (e.g., based on a landmark position such as the user's palm). The computing system may determine variations from the fixed plane based on the 3D mesh, so that the computing system determines that the depth of particular positions (e.g., finger tips, joints, etc.) deviate from the depth of the fixed plane. The variations at these points may be stored in the height grid. The computing system may also calculate heights at positions of the 3D mesh by interpolating known distances (e.g., tracked positions) to determine inferred distances.

As described above, the 3D mesh 502 and the height grid 504 may be generated by the body wearable computing system 120 based on the available computing resources and power resources of the body wearable computing system 120 and the headset system 110. The artificial reality system 100 may seek to balance considerations of rendering latency and graphical quality with the availability of resources such as computing power, memory availability, power availability, etc. of the computing systems involved in the artificial reality system 100. For example, the artificial reality system 100 may proactively manage which computing systems are handling tasks such as hand tracking, generating a 3D mesh 502, and generating a height grid 504. The artificial reality system 100 may determine that the headset system has sufficient battery power and processor availability and instruct the headset system 110 to perform these steps. In particular embodiments, it may be preferred to allow the headset system 110 to handle as much of the rendering process as possible to reduce latency introduced by data transfer between the headset system 110 and the body wearable computing system 120.

The 3D mesh 502 and the height grid 504 may be passed to a frame renderer 506. In particular embodiments, the frame renderer may be embodied in the body wearable computing system 120 or another computing device with more available computing resources than the headset system 110. The frame renderer 506 may convert the 3D mesh 502 into a surface representation that comprises a two-dimensional virtual object primitive based on the boundaries of the 3D mesh 502. The surface may include a 2D texture 508 for the user's hand. In particular embodiments, the 2D texture 508 may be associated with a particular color that flags surface as representing the user's hand. In particular embodiments, the color of the texture may be designated as opaque black, meaning that when "displaying" the texture, no light emitting components should illuminate and that no light (e.g., from virtual objects) should be allowed to pass through the surface when rendering the virtual environment. The surface may also be associated with a height map 510 that maps the positions of the height grid 504 and any interpolated positions to specific positions of the surface. In particular embodiments, there may be a direct correspondence (e.g., on a per-pixel level) between the positions of the 2D texture 508 and the height map 510, where the height grid 504 may have a coarser resolution out of processing necessity. The frame renderer 506 may perform these steps while simultaneously generating surface representations of the virtual objects in the virtual environment. The frame renderer 506 may generate the surface representations based on the viewpoint of the user into the virtual environment. For example, the headset system 110 may include a variety of sensors that allow the headset system 110 to determine an orientation of the user in the virtual environment. The frame renderer 506 may use this orientation information when generating the surfaces with the notion that appropriately-positioned 2D surfaces can be used to represent 3D objects based on the viewpoint of the user. The generated surface, including the 2D texture 508 and the height map 510 may be passed to a sub-frame renderer 512.

The sub-frame renderer 512 may be responsible for performing a primary visibility determination for the virtual object representation (e.g., the surface) of the user's hand. As described in further detail herein, the primary visibility determination may comprise performing ray-casting into the virtual scene and determining whether, for any of the rays, the surface representation for the user's hand is the first surface intersected. That indicates that the user's hand occludes the rest of the virtual objects in the virtual environment and should be displayed to the user. The sub-frame renderer 512 is so named because it may produce frames (e.g., images to be displayed) at higher rate than the frame renderer 506. For example, where the frame renderer 506 may generate data at, for example, 60 frames per second, the sub-frame renderer 512 may generate data at, for example 200 frames per second. The sub-frame renderer 512, in performing its primary visibility determination, may use an updated viewpoint of the user (e.g., updated since the data has been received from the frame renderer 506) to fine-tune the visibility and positioning of any virtual objects (e.g., by modifying the appearance of the corresponding surfaces). In particular embodiments, to further reduce latency, the sub-frame renderer 512 may be embodied in the headset system 110 to be as close as possible to display system that will until output the frames. This is to reduce the latency between a user's movement (e.g., of their head or eyes) and the images shown to the user (which incorporate that movement).

Figure 6:
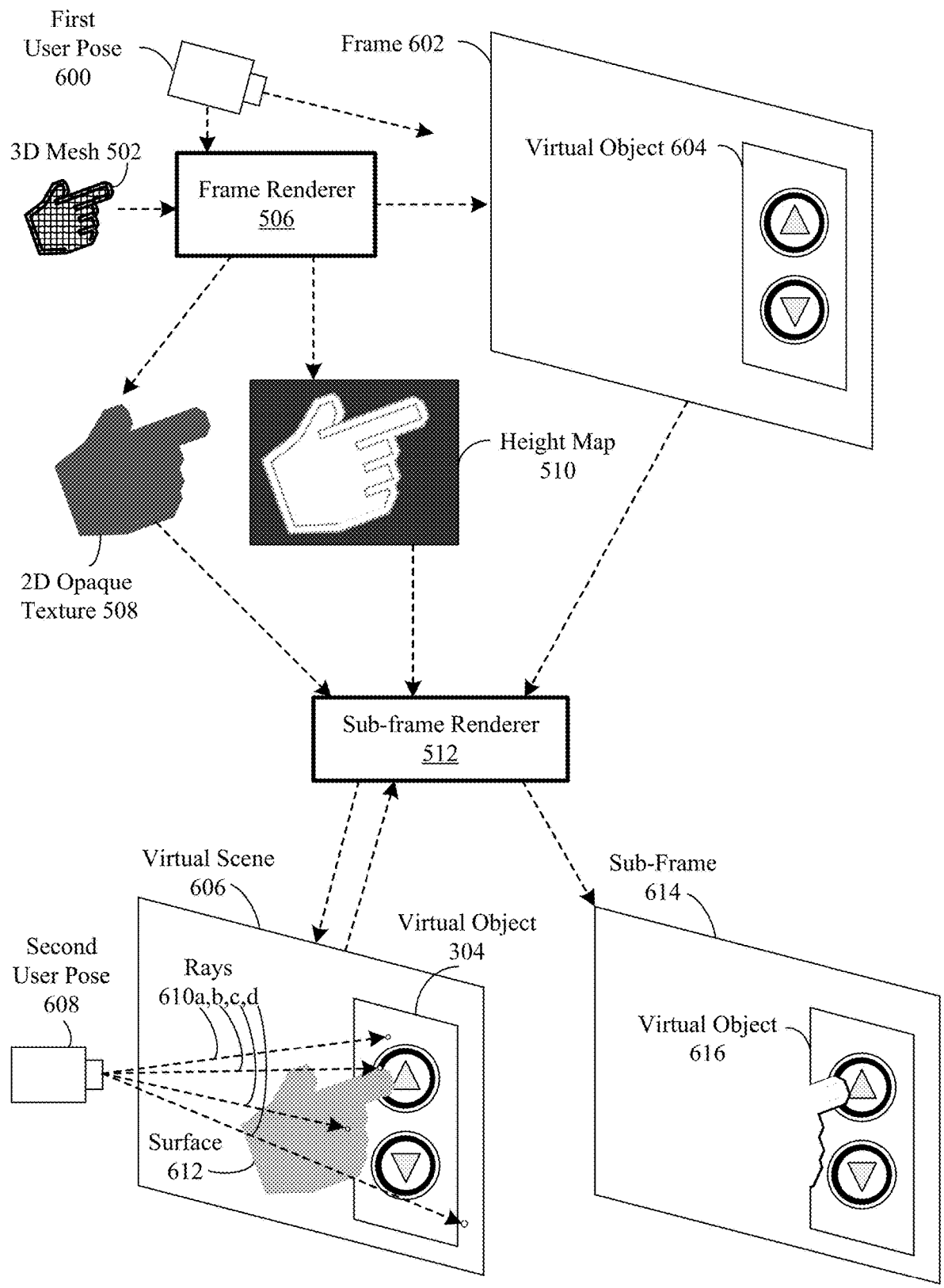
FIG. 6 illustrates a visual representation of generating an image of a virtual environment.

FIG. 6 illustrates the process of generating an image of a virtual scene for a user according to the embodiments discussed herein. FIG. 6 continues to build on the examples shown in FIGS. 3A-3B and FIG. 5. First, a camera of a headset system 110 captures an image of an environment of the user. The image includes an object, such as a user's hand, that will occlude virtual objects in the scene. Simultaneously, the headset system 110 determines a first user pose 600. The first user pose 600 may be determined from the captured image or images (e.g., using SLAM or another localizing technique). The first user pose 600 may be determined based on one or more on-board sensors of the headset system (e.g., an inertial measurement unit). The captured image may be used by, for example, the headset system 110 or the body wearable computing system 120 to perform hand tracking and generate a 3D mesh 502 and height grid 504. The first user pose 600, 3D mesh 502 and height grid 504 may be passed to the frame renderer 506.

The frame renderer 506 may generate the surface virtual object representation of the user hand to be used for a frame 602 based on the 3D mesh 502 and height grid 504 as described above. The surface may include a 2D opaque texture 508, height map 510, and other information necessary to represent the user's hand in the virtual environment, such as a location of the user's hand in the environment, boundaries of the surface, etc. The frame renderer 506 may also generate surfaces representing other virtual objects 604 in the virtual environment. The frame renderer 506 may perform the calculations necessary to produce this information to support a first frame rate (e.g., 60 fps). The frame renderer may pass all this information to the sub-frame renderer 512 (e.g., via a wireless connection if the frame renderer 506 is embodied in the body wearable computer).

The sub-frame renderer 512 may receive the surfaces for the virtual objects 604 and the virtual object representation of the hand of the user. The sub-frame renderer 512 may perform visibility determinations of the surfaces in the virtual scene 606. The sub-frame renderer 512 may determine a second user pose 608. The second user pose 608 may differ from the first user pose 600 because, even though the first user pose 600 is updated with every generated frame, the user may move slightly. Failure to account for the updated pose of the user may dramatically increase user discomfort while using the artificial reality system 100. The visibility determinations may encompass performing raycasting into the virtual environment based on the second user pose 608 with the origin of each of several rays (e.g., rays 610a, 610b, 610c, and 610d) being based on a position in a display of the headset system 110 and the second user pose 608. In particular embodiments, the raycasting may be similar to, or performed with, that performed by the transform blocks 220A and 220B of the display engine 112.

For each ray used for visibility determinations, the sub-frame renderer 512 may project the ray into the virtual environment and determine whether the ray intersects with a surface in the virtual environment. In particular embodiments, the depth testing (e.g., the determination of which surface is intersected first) may be performed on a per-surface level. That is, each surface may have a singular height or depth value that allows the sub-frame renderer 512 (or the transform blocks 220A and 220B) to quickly identify the interacting surface. For example, the sub-frame renderer 512 may cast ray 610a into the virtual environment and determine that the ray intersects first with the surface corresponding to the virtual object 304. The sub-frame renderer 512 may cast ray 610b into the virtual environment and determine that the ray intersects with the virtual object 304 at a point near the surface 612 corresponding to the hand of the user. The sub-frame renderer may cast ray 610c into the virtual environment and determine that the ray first intersects with the surface 612 corresponding to the hand of the user. The sub-frame renderer 512 may cast ray 610d into the virtual environment and determine that the ray does not intersect with any object in the virtual environment.

Each ray projected into the environment may correspond to one or more pixels of an image to be displayed to a user. The pixels corresponding to the ray may be assigned a color value based on the surface with which it intersects. For example, the pixels associated with rays 610a and 610b may be assigned color values based on the virtual object 304 (e.g., by sampling a texture value associated with the surface). The pixels associated with ray 610c may be assigned a color value based on the surface 612. In particular embodiment, the color value may be designated as both opaque (e.g., no blending will occur, or light will pass through) and dark or black to provide instructions to the light emitting components of the display that will eventually display the rendered image. The pixels associated with ray 610d may be assigned a default color. In particular embodiments, the default color may be similar to, or given the same value as, the value used for surface 612. This default color may be chosen to allow the user's environment to be visibility when there are no virtual objects to display (e.g., if there is empty space).

The color value determinations made for each of the rays may be used by the sub-frame renderer 512 to prepare an image for display. In particular embodiments, this may include appropriate steps performed by the pixel blocks 230A and 230B and the display blocks 240A and 240B of the display engine 112. The sub-frame renderer 512 may composite the determined pixel color values to prepare a sub-frame 614 for display to the user. The sub-frame may include a representation of the virtual object 616 appearing to include a cut-out for the user's hand. When displayed by the display components of the headset system, the cut-out may allow the light user's hand to actually appear in place of the surface 612. Thus, the user will be able to perceive their actual hand interacting with the virtual object 616.

Figure 7:
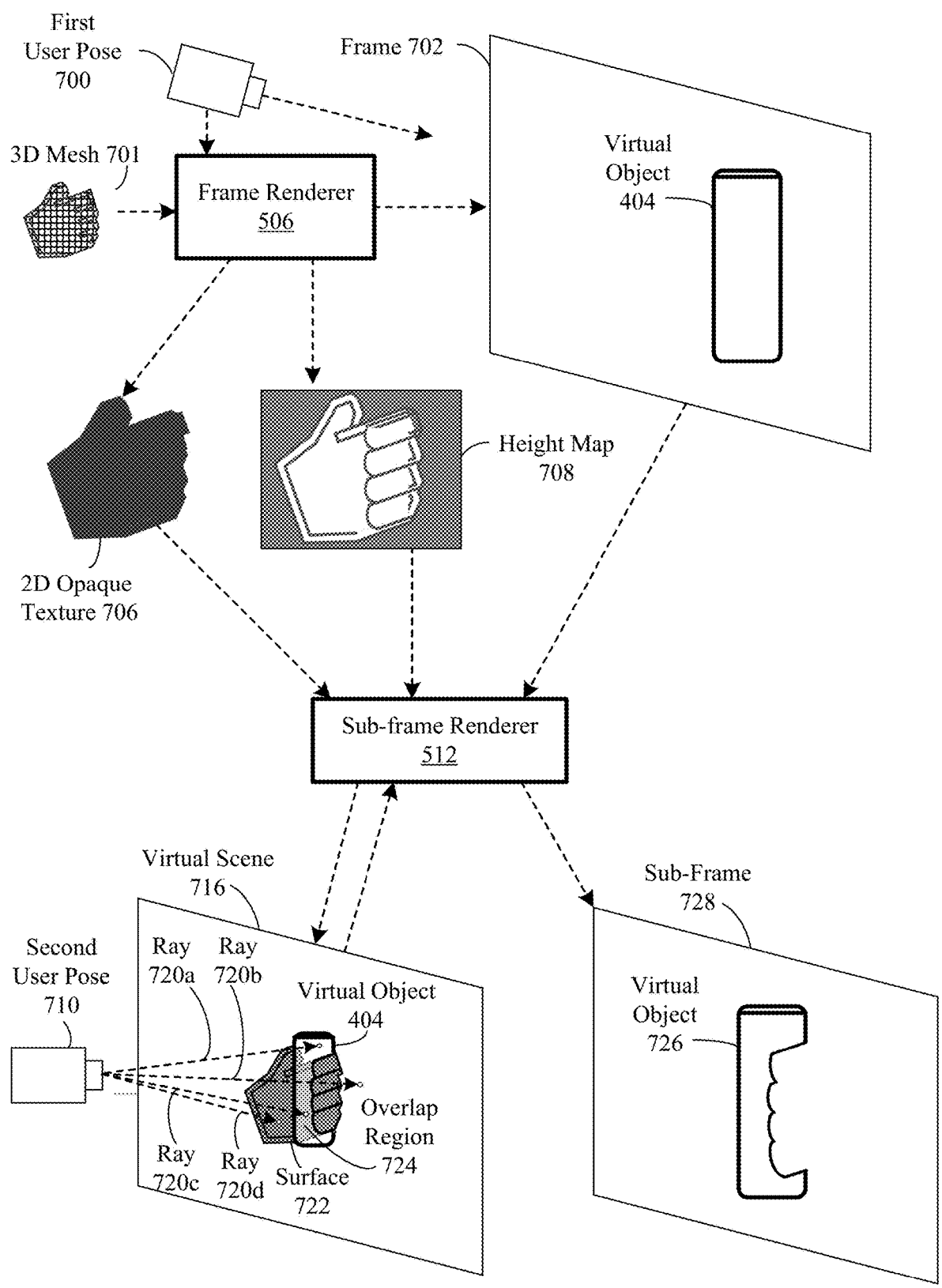
FIG. 7 illustrates a visual representation of generating an image of a virtual environment.

FIG. 7 illustrates the process of generating an image of a virtual scene for a user according to the embodiments discussed herein. FIG. 7 continues to build on the examples shown in FIGS. 4A-4B. First, a camera of a headset system 110 captures an image of an environment of the user. The image includes an object, such as a user's hand, that will occlude virtual objects in the scene. Simultaneously, the headset system 110 determines a first user pose 700. The captured image may be used by, for example, the headset system 110 or the body wearable computing system 120 to perform hand tracking and generate a 3D mesh 701 and corresponding height grid. The first user pose 700, 3D mesh 701 and corresponding height grid may be passed to the frame renderer 506.

The frame renderer 506 may generate the surface (virtual object representation) of the user hand to be used for a frame 702 based on the 3D mesh 701 and height grid as described above. The surface may include a 2D opaque texture 706, height map 708, and other information necessary to represent the user's hand in the virtual environment, such as a location of the user's hand in the environment, boundaries of the surface, etc. The frame renderer 506 may also generate surfaces representing other virtual objects 404 in the virtual environment. The frame renderer 506 may perform the calculations necessary to produce this information to support a first frame rate (e.g., 60 fps). The frame renderer may pass all this information to the sub-frame renderer 512 (e.g., via a wireless connection if the frame renderer 506 is embodied in the body wearable computer).

The sub-frame renderer 512 may receive the surfaces for the virtual objects 404 and the virtual object representation of the hand of the user. The sub-frame renderer 512 may perform visibility determinations of the surfaces in the virtual scene 716. The sub-frame renderer 512 may determine a second user pose 710. The second user pose 710 may differ from the first user pose 700 because, even though the first user pose 700 is updated with every generated frame, the user may move slightly. Failure to account for the updated pose of the user may dramatically increase user discomfort while using the artificial reality system 100. The visibility determinations may encompass performing raycasting into the virtual environment based on the second user pose 710 with the origin of each of several rays (e.g., rays 720a, 720b, 720c, and 720d) being based on a position in a display of the headset system 110 and the second user pose 720. In particular embodiments, the raycasting may be similar to, or performed with, that performed by the transform blocks 220A and 220B of the display engine 112.

For each ray used for visibility determinations, the sub-frame renderer 512 may project the ray into the virtual environment and determine whether the ray intersects with a surface in the virtual environment. In particular embodiments, the depth testing (e.g., the determination of which surface is intersected first) may be performed on a per-pixel level. That is, each of the surfaces of the virtual environment may have a height map or depth map that allows the sub-frame renderer 512 (or the transform blocks 220A and 220B) to distinguish between interactions and intersections between surfaces on an individual pixel basis. For example, the sub-frame renderer 512 may cast ray 720a into the virtual environment and determine that the ray intersects first with the surface corresponding to the virtual object 404.

The sub-frame renderer 512 may cast ray 720b into the virtual environment and determine that the ray does not intersect with any object in the virtual environment. For example, the sub-frame renderer 512 may cast ray 720c into the virtual environment and determine that the ray intersects first with the surface corresponding to the virtual object 404. Note that ray 720c intersects at a point along on overlap region of the surface for the virtual object 724 where the virtual object 724 overlaps the surface 722 corresponding to the hand of the user. The sub-frame renderer may cast ray 720d into the virtual environment and determine that the ray first intersects with the surface 722 corresponding to the hand of the user.

Each ray projected into the environment may correspond to one or more pixels of an image to be displayed to a user. The pixels corresponding to the ray may be assigned a color value based on the surface with which it intersects. For example, the pixels associated with rays 720a and 720c may be assigned color values based on the virtual object 404 (e.g., by sampling a texture value associated with the surface). The pixels associated with ray 720d may be assigned a color value based on the surface 722. In particular embodiment, the color value may be designated as both opaque (e.g., no blending will occur, or light will pass through) and dark or black to provide instructions to the light emitting components of the display that will eventually display the rendered image. The pixels associated with ray 720b may be assigned a default color. In particular embodiments, the default color may be similar to, or given the same value as, the value used for surface 722. This default color may be chosen to allow the user's environment to be visibility when there are no virtual objects to display (e.g., if there is empty space).

The color value determinations made for each of the rays may be used by the sub-frame renderer 512 to prepare an image for display. In particular embodiments, this may include appropriate steps performed by the pixel blocks 230A and 230B and the display blocks 240A and 240B of the display engine 112. The sub-frame renderer 512 may composite the determined pixel color values to prepare a sub-frame 728 for display to the user. The sub-frame may include a representation of the virtual object 726 appearing to include a cut-out for the user's hand. When displayed by the display components of the headset system, the cut-out may allow the user's hand to actually appear in place of the surface 722. Thus, the user will be able to perceive their actual hand interacting with the virtual object 726 and the virtual object 726 appropriately occluding portions of their hand.

Figure 8A:
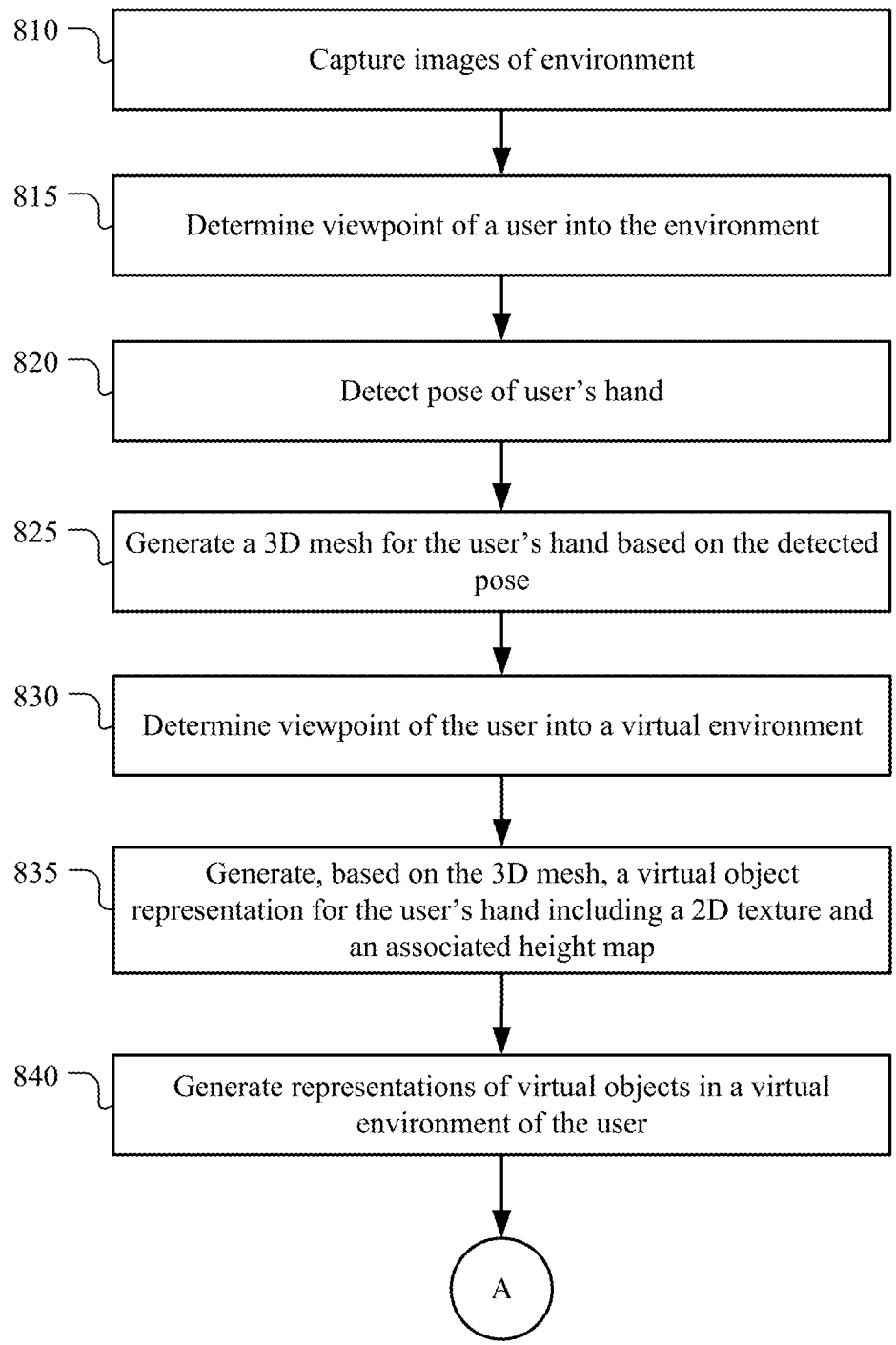
FIGS. 8A-8B illustrates an example method for providing for real-world object occlusion of virtual objects in augmented reality.
Figure 8B:
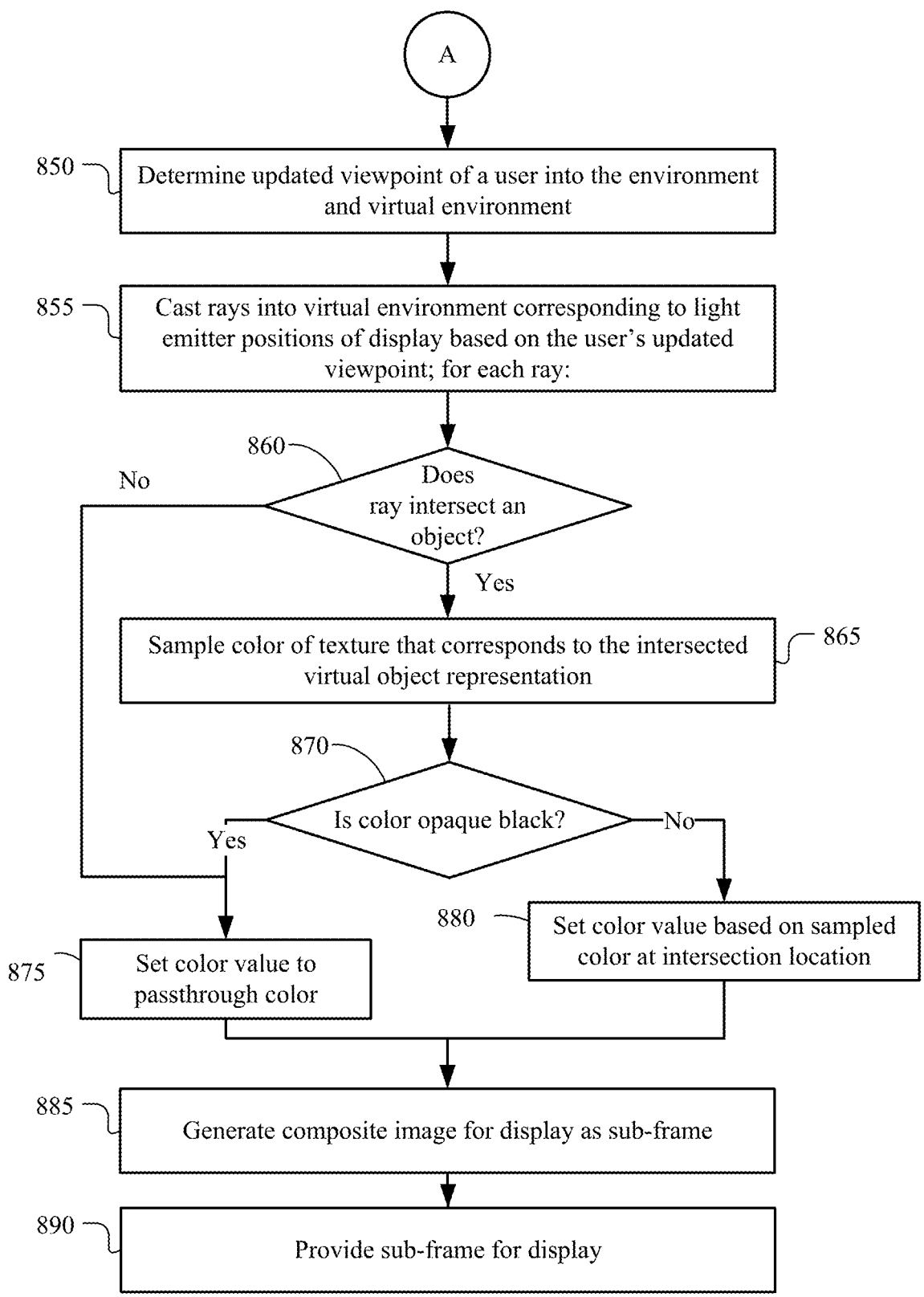

FIGS. 8A-8B illustrates an example method 800 for providing for real-world object occlusion of virtual objects in augmented reality. The method may begin at step 810, where at least one camera of a headset system 110 (e.g., a head-mounted display) may capture images of an environment of the headset system 110. In particular embodiments, the images may be standard full-color images, monochrome images, depth-sensing images, or any other suitable type of image. The images may include an object which the artificial reality system 100 determines should be used to occlude certain virtual objects in a virtual or mixed reality view. In the following example, that object is the user's hand, but can be a wide variety of suitable objects and described above.

In particular embodiments, steps 815-840 may be related to generating a frame to be display to a user based on the position of a user's hand and virtual objects in a virtual environment. In particular embodiments, one or more of steps 815-840 may be performed by the headset system 110, by a body wearable computing system 120, or by another suitable computing system with greater computing resources than the headset system and communicatively coupled to headset system 120. In particular embodiments, the work performed in each step may be allocated among the eligible computing systems by a work controller of the artificial reality system 100.

The method may continue at step 815 where a computing system may determine a viewpoint of a user of the headset system into the environment. In particular embodiments, the viewpoint may be determined purely from the captured images of the environment using a suitable localizing and/or mapping technique. In particular embodiments, the viewpoint may be determined using data retrieved from other sensors of the headset system.

At step 820, a computing system may detect a pose of the user's hand. To detect the post of the user's hand, the computing system may first identify the portion of the capture images that include the user's hand. The computing system may perform one of several algorithms to identify the existence of the user's hand in the capture images. After confirming that the hand actually appears in the image, the computing system may perform a hand tracking analysis to identify the existence and location of several discrete locations on the user's hand in the capture image. In particular embodiments, the hand tracking may be facilitated using depth-tracking cameras. In particular embodiments, the hand tracking may be performed without standard depth tracking using deep learning and model-based tracking. Deep neural networks may be trained and used to predict the location of a person's hand as well as landmarks, such as joints of the hands and finger tips. The landmarks may be used to reconstruct a high degree-of-freedom pose (e.g., 26 degree of freedom pose) of the hand and fingers. The pose may provide a location of the hand relative to the viewpoint of the user in the environment.

At step 825, a computing system may generate a 3D mesh for the user's hand based on the detected pose. Using the captured images, the computing system may prepare a model of the user's hand accounting for the detected pose. In particular embodiments, the 3D mesh may be fully modeled virtual object based on the user's hand, such that the user's hand can be adequately represented in a virtual scene. From the 3D mesh, the computing system may generate a height map of the hand of the user in the environment. For example, the computing system may determine a depth of a portion the user's hand (e.g., a distance of the user's hand from the viewpoint and/or camera). To facilitate accurate occlusion of virtual objects, the location of the user's hand must be known on a much finer-grain basis. It may be prohibitively computationally expensive to calculate the depth accurately based on the image alone. The 3D mesh may be used to fill in gaps because the contours of the user's hands can be determined from the 3D mesh and a height map or a data structure storing various heights of the user's hand can be generated.

At step 830, a computing system may determine a viewpoint of the user into a virtual environment around the user. The virtual environment may be controlled by an artificial reality application being executed by the artificial reality system 100. The virtual environment may comprise a plurality of virtual objects in the virtual environment. Each virtual object may be associated with information describing its size, shape, texture, absolute position (e.g., relative to a fixed point), and relative location (e.g., relative to a viewpoint). The viewpoint in the virtual environment may be determined based on a correspondence between the viewpoint of the user into the real environment and a viewpoint of the user in the virtual environment. The correspondence may be determined by the artificial reality system 100 or may be specified (e.g., calibrated) by the user.

At step 835, a computing system may generate, based on the 3D mesh, a virtual object representation for the user's hand. The virtual object representation, also referenced throughout this disclosure as a surface, may be associated with a texture and an associated height map. In particular embodiments, the virtual object representation may be a 2D representation of the 3D mesh of the user's hand as viewed from the viewpoint into the virtual environment. The 2D representation may be adequate to represent the 3D mesh because the computing system may generate frames at a sufficiently fast rate (e.g., 60 Hz or greater) that a user will not be able to detect that only a 2D representation has been generated.

At step 840, a computing system may generate representations of the other virtual object in the virtual environment based on the models of the virtual objects and the virtual environment and the viewpoint of the user into the virtual environment. Similar to the virtual object representation of the user's hand, these virtual object representations may be associated with a texture for the virtual object and a height map that may be used to quickly simulate 3D model, for example when determining intersections between virtual objects. Taken together, the virtual object representations constitute data for rendering a frame of the virtual environment. In this context, a frame refers to the rate at which the virtual object representations are created. The rate may be determined based on a likelihood of a specific degree of movement of the viewpoint of the user.

The method may advance to step 850, shown in FIG. 8B. Steps 850-890 may be directed to generating and providing sub-frames of the virtual environment for display. The sub-frame may use the data generated and produced as frames of the virtual environment, update data where needed, and actually determine the images that will be shown to the user by display components (e.g., an array of light emitting components) of the headset system 110. Sub-frames may be prepared and displayed at a rate that is much higher than the rate at which frames are prepared (e.g., 200 Hz or higher). Because of the high rate at which sub-frames are prepared, it may be necessary that inter-system communication is limited. Therefore, it may be preferred for the computations required by steps 850-890 to be performed by the headset system 110 itself and not a body wearable computing system 120 or other computing system communicatively coupled to the headset system 110.

At step 850, a computing system may determine an updated viewpoint of the user into the environment and into the virtual environment around the user. The updated viewpoint may be required to allow the sub-frames to be prepare taking into consider minute movements of the user (e.g., head movements, eye movements, etc.). The updated viewpoint may be determined in the same manners as described above.

At step 855, the computing system may perform a primary visibility determination of the viewpoint of the user into the virtual environment with respect to the virtual object representations and the virtual object representation of the user's hand. In particular, the visibility determination may be performed using raycasting techniques. The computing system may organize several rays to be cast into the virtual environment. Each ray may correspond to one or more pixels of an image to be displayed by the headset system 110. Each pixel may correspond to one or more display positions of a light emitter of the headset system 110. The origin of each ray may be based on the viewpoint of the user into the virtual environment and the position of the corresponding pixels. The direction of the ray may similarly be determined based on the viewpoint of the user into the virtual environment. Casting the rays into the virtual environment may be performed to simulate the behavior of light in the virtual environment. Generally speaking, casting the ray constitutes determining whether the ray intersects with a virtual object in the virtual environment and assigning a color to the pixels corresponding to the rays that intersect.

The process for each ray has been partially described with respect to steps 860-880. At step 860, the computing system determines whether each ray intersects a virtual object in the virtual environment. In particular embodiments, the computing system may check for intersections by simulating the path of the ray into the virtual environment for a fixed distance or amount of time. At each step of the path, the ray may compare its position to the positions of the various virtual object representations that have been generated for the particular frame. The positions of the virtual objects are known based on the location specified for the representation, including the depth, and the height map that may be associated with the representation. Using this raycasting technique, the assumption is that the correct color value for the pixels corresponding to the rays is the color value associated with the first virtual object with which it intersects. If the computing system determines that the ray does not intersect with a virtual object, then the method may advance directly to step 875 where, as described further below, the color value associated with the ray (and subsequently the corresponding pixels) is set to a dedicated passthrough color in which the light emitters of the remain unilluminated, allowing light to passthrough from the environment to the user. If the computing system determines that the ray does intersect with a virtual object, then the method may advance to step 865.

At step 865, the computing system may identify the intersected virtual object representation and sample the color of the corresponding texture at the point of intersection. To sample the corresponding color, the computing system may first retrieve the texture associated with the intersected virtual object representation. The computing system may then determine the point on the texture corresponding to the point of intersection. This may encompass converting the point of intersection from global- or view-based coordinates to texture-based coordinates. Once the appropriate coordinates are determined, the computing system may identify the color value stored in the texture at the appropriate position. In particular embodiments, the artificial reality system 100 may use shortcuts to reduce the memory access times required to perform this operation. Such shortcuts may include flagging particular virtual object representations At step 870, the computing system may determine the value of the sampled color. If the sampled color is an opaque black (or other color designated as used to indicate that a corresponding light emitter should remain unilluminated), then the method may proceed to step 875. Otherwise, the method may proceed to step 880.

At step 875, the computing system may set the color value of the pixels corresponding to the ray to a passthrough color. The passthrough color may be used to generate, or may otherwise be associated with, instructions to light emitters signifying that the light emitters should not illuminate when the final image is display to the user as a sub-frame. Example passthrough colors may include black (indicating that the corresponding light emitters should be dark) or clear (indicating that not light should be generated by the light emitters).

At step 880, the computing system may set the color value based on the color sampled from the texture at the point of intersection. In particular embodiments, this may encompass scheduling interpolation of colors at multiple locations (e.g., when the point of intersection is between discrete texel locations of the texture). In particular embodiments, setting the color may encompass performing color adjustments and brightness corrections (as described above with respect to the display blocks 240A and 240B of the display engine 112).

At step 885, the computing system may generate an image for display as a sub-frame based on the color values determine for each ray and corresponding pixel position. The image may be referred to as a composite image because it combines definitive color values for certain positions (e.g., positions of the image that are display virtual objects visible from the user's viewpoint into the virtual environment) and indicates that no light should be produced at all (e.g., light emitters should be unilluminated) at other positions (e.g., positions where the ray did not intersect with a virtual object representation or positions where the ray first intersected with a virtual object representation of the user's hand). Thus, viewing just the composite image, a viewer would see rendered virtual objects and completely blank positions.

At step 890, the computing system may provide the sub-frame for display. The computing system may generate instructions based on the composite image for the light emitters of the display of the headset system 110. The instructions may include the color value, color brightness or intensity, and any of variables effecting the display of the sub-frame. The instructions may also include instructions for certain light emitters to stay unilluminated or turn off if needed. The intended effect, as described throughout, is for the user to be able to see portions of the virtual environment (e.g., virtual objects in the virtual environment) from the determined viewpoint into the virtual environment mixed with portions of the real environment including the user's hands (which may be interacting with virtual objects in the virtual environment).

Particular embodiments may repeat one or more steps of the method of FIGS. 8A-8B, where appropriate. Although this disclosure describes and illustrates particular steps of the method of FIGS. 8A-8B as occurring in a particular order, this disclosure contemplates any suitable steps of the method of FIGS. 8A-8B occurring in any suitable order. Moreover, although this disclosure describes and illustrates an example method for providing for real-world object occlusion of virtual objects in augmented reality including the particular steps of the method of FIGS. 8A-8B, this disclosure contemplates any suitable method for providing for real-world object occlusion of virtual objects in augmented reality including any suitable steps, which may include all, some, or none of the steps of the method of FIGS. 8A-8B, where appropriate. Furthermore, although this disclosure describes and illustrates particular components, devices, or systems carrying out particular steps of the method of FIGS. 8A-8B, this disclosure contemplates any suitable combination of any suitable components, devices, or systems carrying out any suitable steps of the method of FIGS. 8A-8B.

Figure 9:
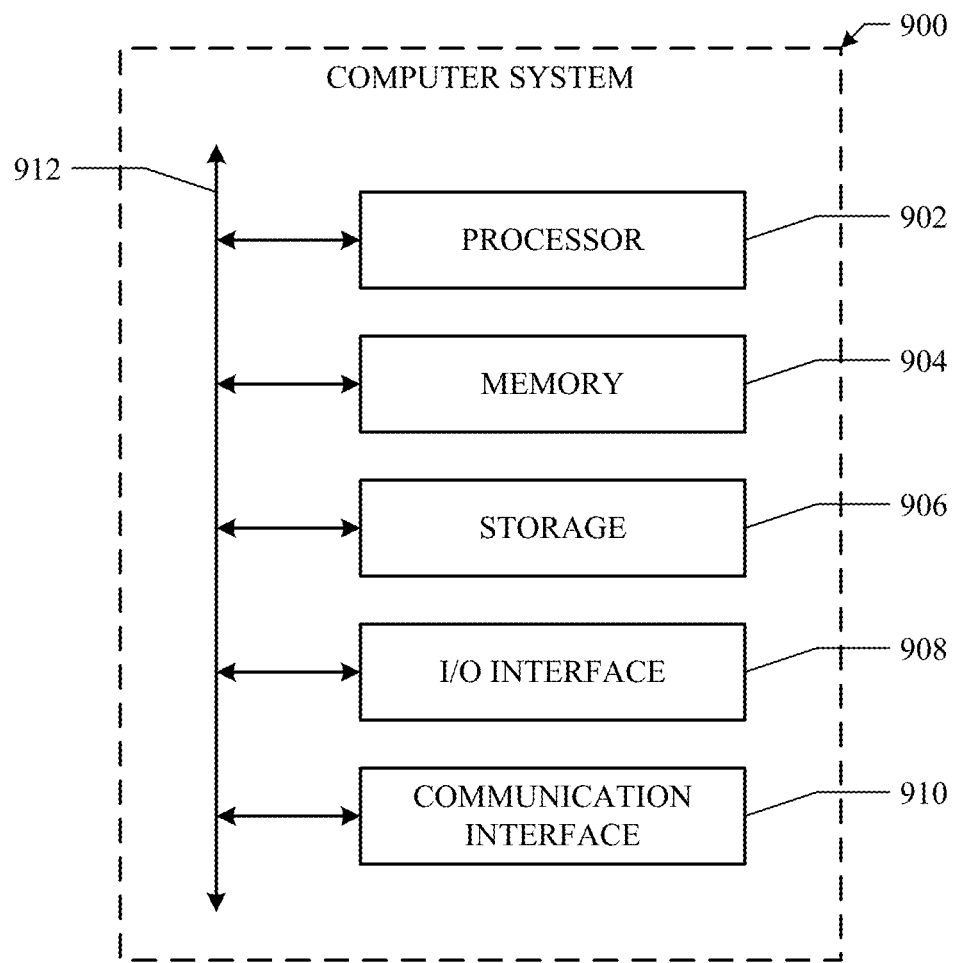
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices:
   accessing an image comprising a hand of a user of a head-mounted display;
   generating, from at least the image, a planar virtual object representation of the hand of the user, the planar virtual object representation of the hand being defined in a virtual environment that comprises at least one other virtual object;
   determining that a depth of a portion of the planar virtual object representation of the hand to a viewpoint of the user is less than a depth of the other virtual object to the viewpoint of the user;
   rendering, based on the planar virtual object representation of the hand and the other virtual object in the virtual environment, an image of the virtual environment from the viewpoint of the user, the image comprising a set of pixels that corresponds to the portion of the planar virtual object representation of the hand with the depth that is less than the depth of the other virtual object to the viewpoint of the user; and
   providing, to a set of light emitters of the head-mounted display, instructions to display the image of the virtual environment, wherein the set of pixels in the image that corresponds to a portion of the planar virtual object representation of the hand cause light emitters at one or more positions to be unilluminated.

2. The method of claim 1, wherein a light emitter at a particular position being unilluminated causes light from an environment of the user to continue on to the user at the particular position.

3. The method of claim 1, wherein the image comprising the hand of the user further comprises an environment of the user from the viewpoint of the user.

4. The method of claim 1, wherein generating, from at least the image, a planar virtual object representation of the hand of the user comprises:
   determining a position in the virtual environment of the planar virtual object representation of the hand of the user based on a pose of the hand of the user determined from the image comprising the hand of the user.

5. The method of claim 1, wherein a texture of the planar virtual object representation of the hand of the user corresponds with instructions to cause light emitters to be unilluminated.

6. The method of claim 1, wherein the planar virtual object representation of the hand of the user is associated with a color also associated with a background of the virtual environment.

7. The method of claim 1, wherein rendering the image of the planar virtual environment from the viewpoint of the user comprises:
   determining that the planar virtual object representation of the hand of the user and the other virtual object in the virtual environment are visible from the viewpoint of the user.

8. The method of claim 1, further comprising determining one or more positions where the planar virtual object representation of the hand is at least partially in front of the at least one other virtual object in the virtual environment by:
   projecting a ray into the virtual environment with an origin and direction based on the viewpoint of the user; and
   determining a point of intersection of the ray with the planar virtual object representation of the hand of the user in the virtual environment, wherein the ray intersects with the planar virtual object representation before intersecting with the other virtual object in the virtual environment.

9. The method of claim 1, wherein generating, from at least the image, a planar virtual object representation of the hand of the user comprises:
   determining, from at least the image, a pose of the hand;
   generating, from at least the image and the pose, a triangle mesh corresponding to the hand;
   determining, from at least the image, a distance of the hand from the viewpoint of the user; and
   generating, based on the triangle mesh corresponding to the hand, a height map indicating a variation of one or more positions of the hand from the determined distance of the hand.

10. The method of claim 9, wherein determining that the depth of the portion of the planar virtual object representation of the hand to the viewpoint of the user is less than the depth of the other virtual object to the viewpoint of the user by:
   comparing the distance of the hand and the height map associated with the planar virtual object representation of the hand to a distance and a height map associated with the other virtual object at a particular position; and
   determining based on the comparison that the planar virtual object representation of the hand is a closest object to the viewpoint.

11. The method of claim 1, wherein the instructions to display the image of the virtual environment further cause light emitters to illuminate at one or more positions where a portion of the other virtual object is in front of the planar virtual object representation of the hand of the user from the viewpoint of the user.

12. The method of claim 1, wherein one or more of the computing devices is embodied in the head-mounted display and one or more of the computing devices is a separate computing device.

13. The method of claim 12, further comprising:
   allocating the steps of the method between the computing device of the head-mounted display and the separate computing device based on one or more metrics of available computing resources.

14. The method of claim 1, wherein the image is generated by a first camera of the head-mounted display; and
   wherein generating the planar virtual object representation of the hand of the user comprises:
      accessing a second image generated by a second camera of the head-mounted display; and
      localizing the hand of the user relative to the viewpoint of the user based on the image and the second image.

15. The method of claim 14, wherein generating the planar virtual object representation of the hand of the user further comprises:
   generating an array with positions corresponding to positions of the hand of the user;
   storing, in the array, values of a distance between the one or more positions of the hand and the viewpoint of the user; and
   associating the array with the planar virtual object representation of the hand of the user.

16. The method of claim 14, wherein the second camera of the head-mounted display is a depth-sensing camera.

17. One or more computer-readable non-transitory storage media embodying software that is operable when executed to perform operations comprising:
   accessing an image comprising a hand of a user of a head-mounted display;
   generating, from at least the image, a planar virtual object representation of the hand of the user, the planar virtual object representation of the hand being defined in a virtual environment that comprises at least one other virtual object;
   determining that a depth of a portion of the planar virtual object representation of the hand to a viewpoint of the user is less than a depth of the other virtual object to the viewpoint of the user;
   rendering, based on the planar virtual object representation of the hand and the other virtual object in the virtual environment, an image of the virtual environment from the viewpoint of the user, the image comprising a set of pixels that corresponds to the portion of the planar virtual object representation of the hand with the depth that is less than the depth of the other virtual object to the viewpoint of the user; and
   providing, to a set of light emitters of the head-mounted display, instructions to display the image of the virtual environment, wherein the set of pixels in the image that corresponds to a portion of the planar virtual object representation of the hand cause the light emitters at one or more positions to be unilluminated.

18. The computer-readable non-transitory storage media of claim 17, wherein a light emitter at a particular position being unilluminated causes light from an environment of the user to continue on to the user at the particular position.

19. A system comprising:
   one or more processors; and
   one or more computer-readable non-transitory storage media coupled to one or more of the processors and comprising instructions operable when executed by one or more of the processors to cause the system to perform operations comprising:
   accessing an image comprising a hand of a user of a head-mounted display;
   generating, from at least the image, a planar virtual object representation of the hand of the user, the planar virtual object representation of the hand being defined in a virtual environment that comprises at least one other virtual object;
   determining that a depth of a portion of the planar virtual object representation of the hand to a viewpoint of the user is less than a depth of the other virtual object to the viewpoint of the user;
   rendering, based on the planar virtual object representation of the hand and the other virtual object in the virtual environment, an image of the virtual environment from the viewpoint of the user, the image comprising a set of pixels that corresponds to the portion of the planar virtual object representation of the hand with the depth that is less than the depth of the other virtual object to the viewpoint of the user; and
   providing, to a set of light emitters of the head-mounted display, instructions to display the image of the virtual environment, wherein the set of pixels in the image that corresponds to a portion of the planar virtual object representation of the hand cause light emitters at one or more positions to be unilluminated.

20. The system of claim 19, wherein a light emitter at a particular position being unilluminated causes light from an environment of the user to continue on to the user at the particular position.

* * * * *